United States Patent
Buchko et al.

(12)

(10) Patent No.: US 6,229,813 B1
(45) Date of Patent: May 8, 2001

(54) POINTER SYSTEM FOR QUEUE SIZE CONTROL IN A MULTI-TASK PROCESSING APPLICATION

(75) Inventors: Steven W. Buchko, Kanata; Wade Neville, Almonte, both of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/199,157

(22) Filed: Nov. 25, 1998

(51) Int. Cl.[7] .............................. H04J 3/00; H04L 12/56; H04Q 11/04
(52) U.S. Cl. ...................... 370/412; 370/414; 370/429; 370/237; 370/235; 709/200; 709/300; 709/232 709/234
(58) Field of Search ........................................ 709/300, 200; 370/414, 429, 412, 410, 237, 397, 235, 462, 399, 362, 229; 705/234; 712/114; 721/147; 707/232; 710/52

(56) References Cited

U.S. PATENT DOCUMENTS

| 4,499,576 | * | 2/1985 | Fraser | 370/412 |
|---|---|---|---|---|
| 5,224,215 | * | 6/1993 | Disbrow | 709/234 |
| 5,231,633 | * | 7/1993 | Hluchyj et al. | 370/429 |
| 5,335,224 | * | 8/1994 | Cole et al. | 370/235 |
| 5,521,916 | * | 5/1996 | Choudhury et al. | 370/414 |
| 5,541,912 | * | 7/1996 | Choudhury et al. | 370/412 |
| 5,581,705 | * | 12/1996 | Passint et al. | 709/200 |
| 5,625,846 | * | 4/1997 | Kobayakawa et al. | 710/52 |
| 5,629,928 | * | 5/1997 | Calvignac et al. | 370/237 |
| 5,838,922 | * | 11/1998 | Galand et al. | 709/232 |
| 6,029,205 | * | 2/2000 | Alferness et al. | 709/300 |
| 6,052,375 | * | 4/2000 | Bass et al. | 370/412 |

FOREIGN PATENT DOCUMENTS

2321821A * 8/1998 (EP) .

\* cited by examiner

Primary Examiner—Meng-Al T. An
Assistant Examiner—Wen-Tai Lin
(74) Attorney, Agent, or Firm—Marks & Clerk (57) ABSTRACT

A system and method for controlling queue size in a multiprocessor environment wherein items taken from queues associated with a first processor continue to use system resources in a second processor. A three pointer system is used to distinguish between an enqueue location, a dequeue location and a virtual dequeue location. The virtual dequeue pointer is indexed only after items taken from the queues have completely cleared the system. An application of the three pointer system in a Carrier Scale Internetworking (CSI) architecture is also discussed.

17 Claims, 6 Drawing Sheets

POINTER SYSTEM FOR QUEUE SIZE CONTROL IN A MULTI-TASK PROCESSING APPLICATION

FIELD OF THE INVENTION

This invention relates to digital systems wherein processed items are temporarily stored in queues, typically having limited capacity, pending further processing and more particularly to a method and mechanism for controlling queue size in such systems by selectively assigning multiple control variables such as pointers to each of the queues.

BACKGROUND

In many digital systems, such as communications networks, user data and control traffic contend for processing time slots either within a system architecture or-at a system to system interface. In order to provide some control to the handling of such traffic it is common to generate one or more queues, typically in the form of first in first out (FIFO) buffers, wherein the traffic is separated in accordance with given traffic parameters and some form of arbitration is used to establish the order in which the queues are processed. Arbitration schemes such as round robin, exhaustive round robin or weighted round robin are commonly used.

In certain implementations, packets or cells, including both user data and control data are placed in queues for subsequent processing. If, however, the data packets or cells contain considerable information the data is placed in data buffers and the address assigned to each item in the data buffers is placed in the queues. Frequently, the items in the queues must be further processed either within the system or by an associated system having a separate processor.

The mechanisms for generating queues in software are generally well known. Typically, such queues are implemented as either an array such as a circular array or a linked list. Generally, queues make use of either an enqueue pointer or an index to identify where pointers to items or the items should be inserted into or added to the queue. Further, either a dequeue pointer or index to identify where pointers to items should be removed from the queue are provided. Optionally, a counter may be implemented that indicates the number of items or pointers to items currently stored on the queue.

Generally, the queues are of fixed size and before additional items may be added the queue size is checked to determine if there is room to insert another item. This is typically done by checking the optional counter described above or by calculating the difference between the enqueue pointer and the dequeue pointer.

A problem arises when there are multiple queues to be serviced and as discussed above, the items need to be processed by the system for some time after they have been removed from the queue. For a variety of reasons, i.e. division of responsibilities between processors for performance, access to memory systems in a multitask environment, interrupt handler, relatively complex algorithms for determining which queue to service next, etc., it is often desirable to have one task choose the next queue to remove an item from, remove the item and then pass it on to another processor, task, or procedure for subsequent processing.

Because the items are still being processed by the system after removal from the queue, the queue could be empty but a large number of items are still being consumed by the system. In order to prevent this situation from occurring, current implementations generally try to limit the rate at which items are removed from the queue so that items are dequeued at approximately the same rate at which they are subsequently processed.

This creates a difficult balance to achieve in practice and usually requires elaborate feedback mechanisms to instruct the processor responsible for dequeuing to either speed up or slow down.

A specific application requiring a mechanism for controlling queue size in a multiprocessor system relates to Newbridge Networks Corporation's Carrier Scale Internetworking (CSI) implementation. Carrier Scale Internetworking introduces the concept of Realms wherein a network is divided into virtual service networks which may encompass bridged or routed virtual private networks (VPN) or public internet connectivity. Through CSI a service provider can offer virtual private network services to individual customers. The service provider is also able to offer a differentiated class of service (CoS) through the CSI architecture. The Internetworking Service Card (ISC) within the CSI architecture provides, amongst other things, the class of service functionality. Currently, there are three classes of service offered, namely a control class for control traffic and standard and premium classes of service for user data traffic.

The ISC includes a multiprocessor environment wherein a first processor examines information packet headers and organizes the packets into separate queues according to the aforementioned criteria. The queues are serviced in accordance with an arbitration scheme and the items serviced from the queues are further processed in a second processor. As discussed previously, the task of controlling queue size in a multiprocessor environment presents a significant problem.

Accordingly, there is a requirement for an improved mechanism for controlling the queue length or queue size in a multi task processor system or a multiprocessor system in which items removed from queues continue to use up system resources during subsequent processing.

SUMMARY OF THE INVENTION

It is an object of the present invention to provide a mechanism by which the simple queue length comparisons which are done as part of the enqueing process, can be extended to effectively control the consumption of system resources in situations where items are removed from a queue and then continue to be processed by the system.

The present invention, therefore, relates to an environment in which: items or pointers to items are placed on queues; each queue cannot grow beyond some predetermined length which may or may not vary in response to the availability of resources in the system; items removed from the queues are subject to further processing either by one or more processors or by other tasks or procedures running on the same processor; and the items which have been removed from the queue and passed onto another processor/task/procedure continue to consume resources and hence need to be taken into consideration when calculating the current queue size to decide if additional items can be added to the queue.

The present invention involves the introduction of an additional control variable to each queue, this variable can be implemented as either a virtual dequeue pointer/index or a virtual queue length counter. When items are placed on the queue the queue size is checked. This is accomplished either by checking the size of the virtual queue length counter or by calculating the difference between the enqueue pointer and the virtual dequeue pointer. If too many items are present on the queue then an item is returned to the system free pool. This item may be either the item that was to be enqueued or one of the items already present on the queue depending on the desired behaviour of the system.

When items are dequeued, the dequeue pointer is used to identify the item to remove and the dequeue pointer is updated accordingly upon removal of an item. The queue length counter is also decremented if it is present. However, the virtual dequeue pointer or the virtual queue length counter is not modified at this time. The item is then passed onto another processor for further processing. When this further processing is completed the item is no longer being consumed by the system. The processor responsible for freeing the item updates the virtual dequeue pointer or decrements the virtual queue length counter.

Hence, when enqueuing occurs the queue length calculation includes not only the items that are still physically present on the queue but also includes items that have been removed from the queue but are still being consumed elsewhere in the system. This ensures that relatively slow processing of items removed from a particular queue cannot consume all the items in the system. The resource consumption is checked at the time items are enqueued, and items are returned to the system free pool if more than a previously defined number are already being consumed by the queue and any processors that manipulate the items after removal from the queue.

Therefore, in accordance with a first aspect of the present invention there is provided in a data processing environment where a data stream is statistically multiplexed in per item queues and selectively removed therefrom for subsequent processing, the subsequent processing consuming system resources there is provided an indexing method for use in regulating flow of the data stream comprising: assigning a first indexing control variable to each of the queues to dynamically designate a next location for adding an item; assigning a second indexing control variable to each of the queues to dynamically designate the next location for removal of an item; and assigning a third indexing control variable to each queue to designate the location of the last item removed from the queue, the third indexing control variable being indexed only when the last item removed from the queue has been subsequently processed.

In accordance with a second aspect of the invention there is provided a system for controlling queue size in a data processing architecture comprising: first indexing means to assign a first indexing control variable to the queue, the first indexing control variable designating a next queue location for receiving a data item; second indexing means to assign a second indexing control variable to the queue, the second indexing control variable designating a next queue location for removal of a data item; and third indexing means to assign a third indexing control variable to the queue, the third indexing control variable designating a data item removed from the queue but not yet completely processed by the processing architecture.

In accordance with a further aspect of the invention there is provide in a digital system having a first processor for receiving a stream of packets and multiplexing the stream into packet queues in accordance with traffic parameters and a second processor for selectively receiving packets from the queues for subsequent processing a method of controlling queue size comprising: assigning a first indexing control variable to the packet queues, the first indexing control variable designating a location in the queues for receiving a next packet; assigning a second indexing control variable to the queues, the second indexing control variable designating a location in the queues from which a next packet is to be serviced; and assigning a third indexing control variable to the queues, the third indexing control variable designating a last packet having been serviced but which has not yet been processed by the second processor.

In accordance with a still further aspect of the invention there is provided a system for controlling queue size in a digital communications network, the network including first processing means for receiving data packets and placing the received packets into queues in accordance with traffic parameter information included with the packet and second processing means for selectively receiving packets from the queues for subsequent processing, the system comprising: first indexing means to assign a first indexing control variable to each of the queues, the first indexing control variable designating a next queue location for receiving a data item; second indexing means to assign a second indexing control variable to each of the queues, the second indexing control variable designating a next queue location for removal of a data item; and third indexing means to assign a third indexing control variable to each of the queues, the third indexing control variable designating a data item having been removed from the queue but not yet completely processed by the second processing means.

In a preferred embodiment of this aspect of the invention the first indexing control variable is an enqueue pointer, the second indexing control variable is a dequeue pointer and the third indexing control variable is a virtual dequeue pointer.

BRIEF DESCRIPTION OF THE DRAWINGS

The invention will now be described in greater detail with reference to the attached drawings wherein.

DETAILED DESCRIPTION OF THE INVENTION

Figure 1:
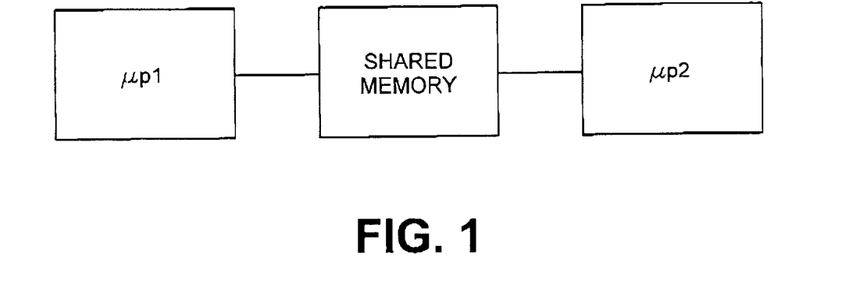
FIG. 1 is a high level view of a dual processor environment with shared memory.

FIG. 1 is a high level illustration of a dual processor environment utilizing a shared or global pool memory. According to this simplified version of a processing system in a dual processor environment, items are processed in microprocessor 1 ($\mu$p1) prior to being forwarded to microprocessor 2 ($\mu$p2) for a second operation. In this simple example, data items or pointers to data items are placed in queues in the shared memory by $\mu$p1 and subsequently retrieved from the shared memory by $\mu$p2 for further processing. Because the shared memory represents a limited resource there is a requirement to control the egress of items from μp1 bearing in mind that these items are still being processed by μp2.

Figure 2A:
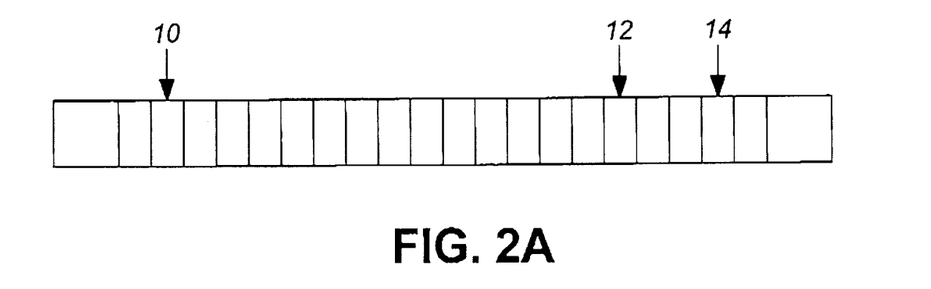
FIGS. 2A to 2C illustrate a three-pointer system according to the basic concept of the present invention.
Figure 2B:
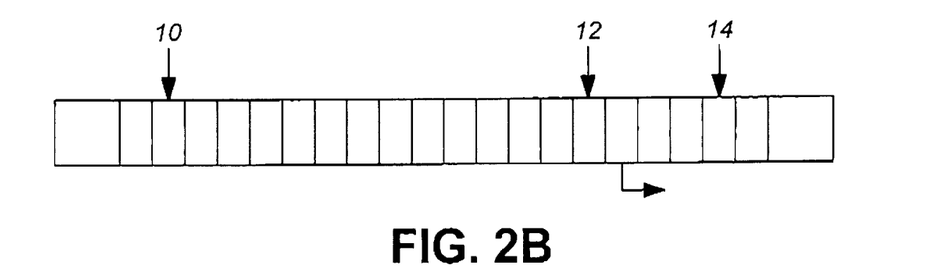
Figure 2C:
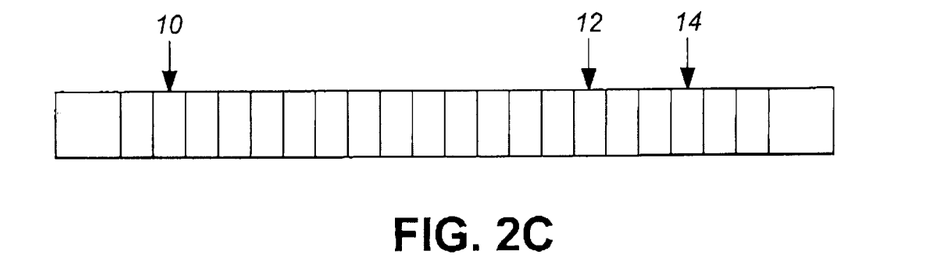

FIGS. 2A through 2C show at a high level the three-pointer system for traffic control according to the basic concept of the present invention.

FIGS. 2A through 2C represent a queue in a circular array format. In FIG. 2A, the three pointers are illustrated. Pointer 10 represents an enqueue pointer which is the location in the array where a next item to be added to the queue can be inserted. Pointer 12 is the dequeue pointer which represents the location in the queue for which an item is to be serviced next. Pointer 14 identified herein as a virtual dequeue pointer represents the location of the last item to have been removed from the queue but is still being processed elsewhere in the system.

FIG. 2B illustrates the same queue in which an item has been removed from the queue for subsequent servicing. As noted the enqueue pointer has not moved nor has the virtual dequeue pointer while the dequeue pointer has advanced one position. Of course had an item been added to the queue during the time interval between the conditions of FIGS. 2A and 2B the enqueue pointer would have been suitably indexed.

FIG. 2C represents the same queue after the item which was being processed in FIG. 2B has cleared the system. The virtual dequeue pointer is then indexed one position.

Under the conventional two-pointer system according to the prior art the indexing of the dequeue pointer as shown in FIG. 2B would have indicated to the system that there was room in the queue to accept further items. This results in the unfair processing of queues, particularly when multiple queues are involved as discussed previously. In accordance with this model the question of whether a queue can accept more items is evaluated according to the enqueue pointer and the virtual dequeue pointer rather than between the enqueue pointer and the dequeue pointer as in the prior art.

A specific example of an implementation incorporating the three-pointer system will now be described in relation to a digital network and more particularly to Newbridge Networks Corporation's Carrier Scale Internetworking (CSI) system wherein a Service Provider offers virtual service networks (VSNs) to individual customers. Through CSI the network backbone is divided into Realms wherein each Realm is capable of providing to a customer a bridged and/or routed virtual private network service or access to the Public Internet (PI).

Figure 3:
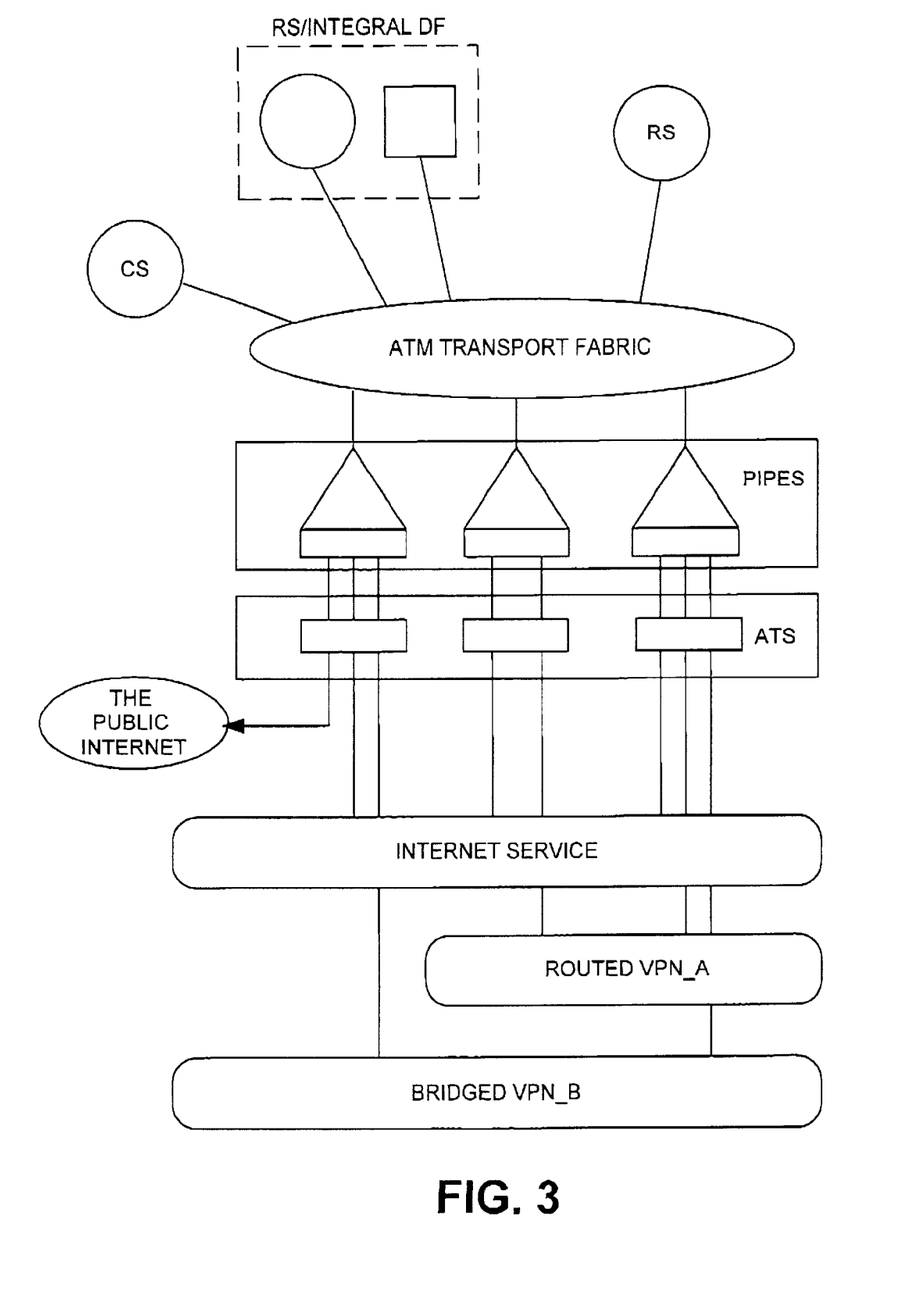
FIG. 3 is a high-level view of a CSI system.

FIG. 3 illustrates, at a high level, a typical CSI application. This Figure shows how a CSI system can be used by a network operator to provide a mix of services to various customers while maintaining necessary partitioning of control information and traffic load. In FIG. 3 edge forwarders such as access terminations (ATs) and PIPES known herein as Internetworking Service Cards (ISCs) are implemented in Newbridge's NainStreetExpress 36170 multiservices switch at the edge of the ATM backbone. Canadian patent application Ser. No. 2,217,275 filed Oct. 3, 1997 and assigned to Newbridge Networks Corporation provides greater details on the CSI system and the concept of Realms. The contents of the Canadian application are incorporated herein by reference.

Figure 4:
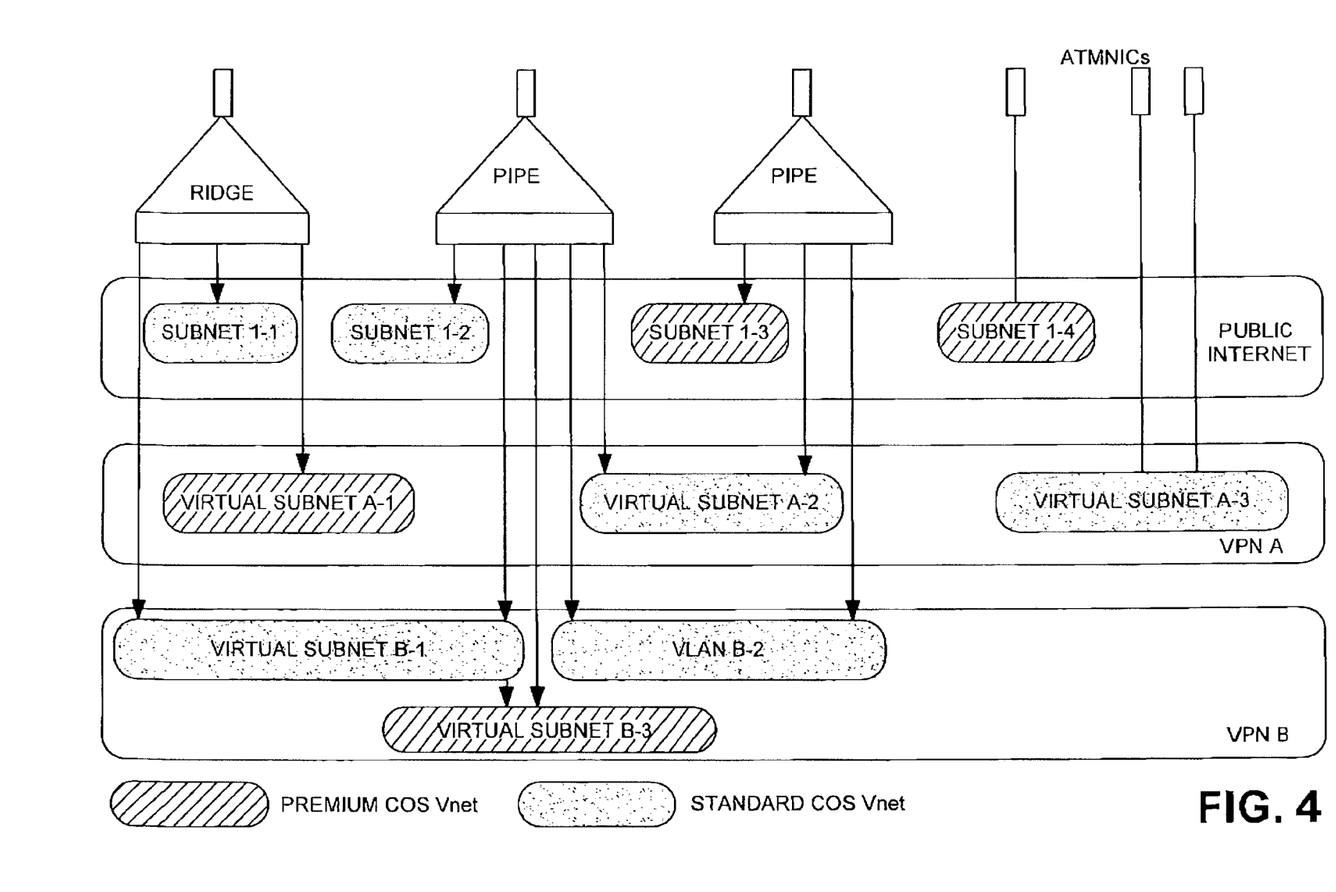
FIG. 4 illustrates a class of service implementation in the CSI architecture.

One significant aspect of the CSI system in relation to the present application is the ability, by a provider, to offer differentiated service to respective customers. As shown in FIG. 4 each Realm includes instances of bridged and or routed virtual private networks and PI access offering different classes of service. In FIG. 4 two classes of service are offered namely, standard and premium. Additionally, control traffic is assigned a class of service having higher priority than either of the aforementioned user data classes of service. It is to be understood, however that these three classes do not represent a limit but are discussed here as a exemplary implementation. Canadian Patent application Ser. No. 2,224,229 filed Jun. 30, 1998 and also assigned to Newbridge Networks Corporation provides greater details regarding class of service functionality. The contents of Canadian patent application 2,224,229 are incorporated herein by reference.

Figure 5:
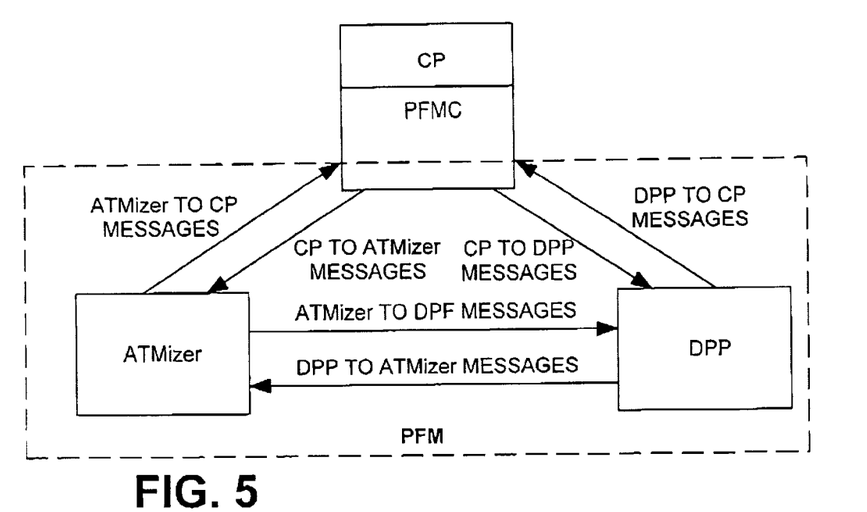
FIG. 5 illustrates an inter-processor communication overview in a multiprocessor environment.

In the context of CSI the aforementioned Internetworking Service Card (ISC) is implemented in a multiple processor environment. FIG. 5 illustrates the inter-processor communication in the ISC architecture. ATM cells flow into and out of the ISC via the ATMizer. The ATMizer is responsible for segmenting ATM cells into data packets for processing by the Data Packet Processor (DPP) and for reassembling packets into ATM cells for delivery back to the backplane. The ATMizer also performs ATM level traffic shaping. The DPP performs header encapsulation and IP forwarding functions. The packet header includes information as to the virtual circuit (VC) to which the packet belongs as well as the Realm. Additionally the header includes the class of service (COS) assigned to the packets.

Within the DPP, packets are placed in per VC queues depending on the specified COS. In the present example three levels of COS are specified namely; control, and two levels of user data: standard and premium. Control has priority while some form of weighting is applied to premium and standard COS. This will be discussed in greater detail later.

Figure 6:
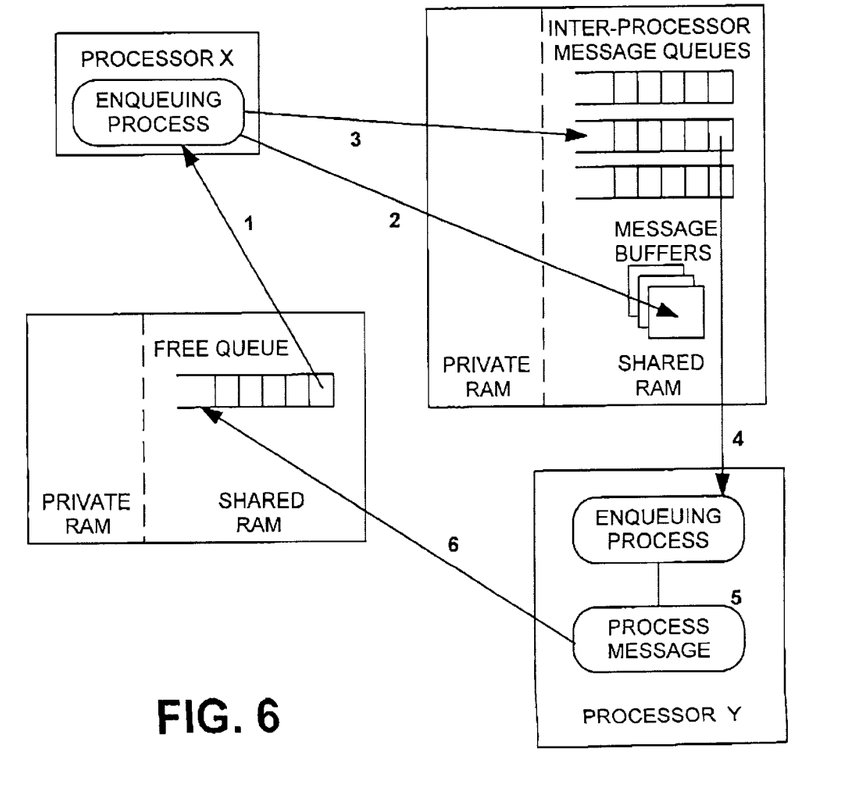
FIG. 6 illustrates inter-processor communication methodology.

In the DPP the data items or pointers to items are placed into the three COS queues and serviced in accordance with a set protocol. The serviced items are then passed back to the ATMizer for further processing. FIG. 6 illustrates an inter-processor communication methodology involving dual processors and a shared memory. As discussed previously the triple pointer concept represents a mechanism for controlling queue size in this implementation.

The DPP checks the packet header to determine the VC to which it belongs as well as the COS. It is then placed in one of the aforementioned COS queues after the queue has been checked to determine whether there is sufficient room. This is done by checking the queue counter or calculating the space between the enqueue pointer and the virtual dequeue pointer. If there is not sufficient space the packet is discarded or one of the queued packets is discarded to make room for the new packet, if appropriate. This decision is implementation specific. Because the queued items need to be further processed by the ATMizer it is important that items not be added to the queues at a faster rate than can be processed in the ATMizer, considering arbitration schemes which ensure fair treatment of all traffic.

Figure 7:
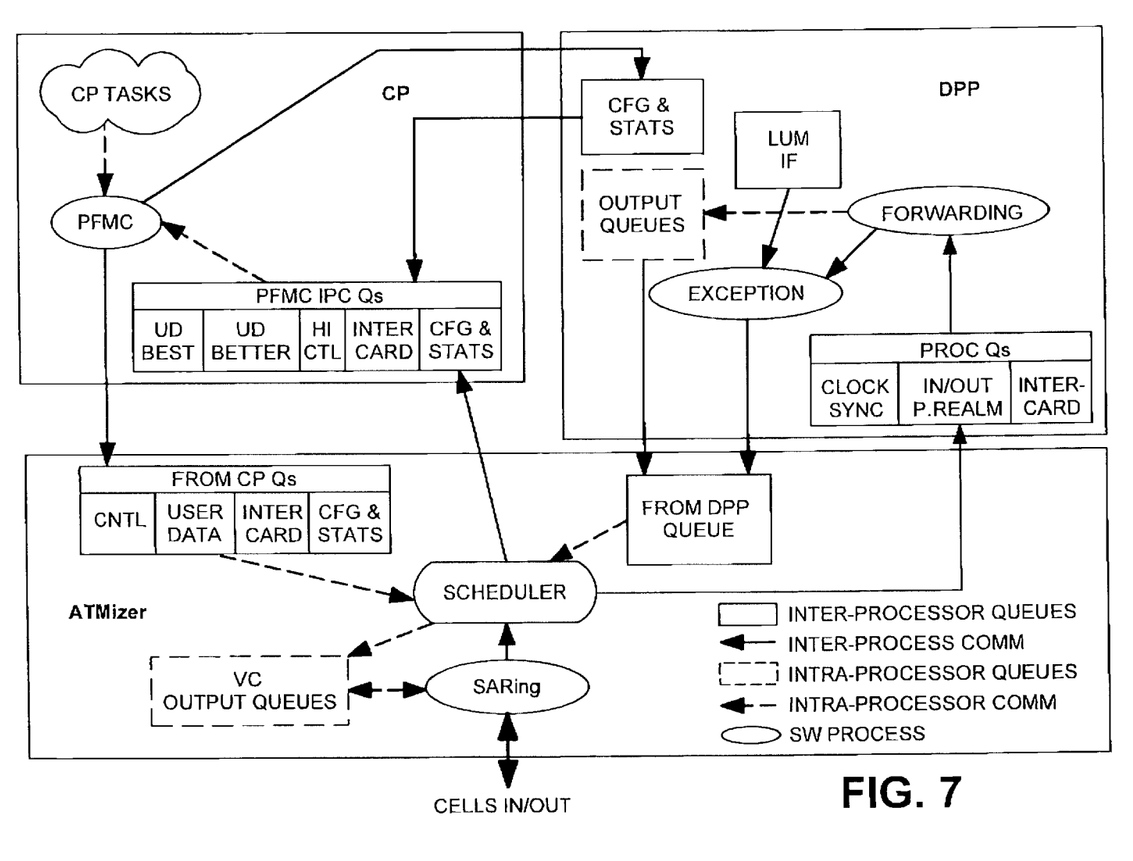
FIG. 7 illustrates processor queues in an ISC.

FIG. 7 illustrates the queue processing functionality within the ISC.

There are several goals that the COS output queuing subsystem attempts to satisfy in this exemplary embodiment:

1. There must be fairness between realms;
2. Within a realm, Control traffic is output using exhaustive round-robin;
3. Within a realm, High and Low priority traffic is allocated 80% and 20%, respectively, of the bandwidth leftover after control traffic is transmitted;
4. Low priority traffic can get 100% of the bandwidth if there is no High Priority or Control traffic queued.

5. With the mixture of high-speed, and low-speed interfaces, the queuing mechanism must avoid head-of-line blocking. This forces the design towards a per-VC queuing mechanism.
6. There are a limited number of data buffers in the system, so the queuing mechanism must ensure that an individual VC (or small subset of VCs) cannot consume all the buffers.

In the present embodiment there are 3 queues per VC—a Control Queue, a Premium Queue, and a Standard Queue. The queues are implemented as arrays, with their size being a power of 2 (for example each queue may be 16 packets deep) The pseudo-code that follows shows the basic implementation of the VC packet queues (use of the atmizerDequeIndex is explained later).

```
#define MaxVcQueLength (16)    /* MUST be a power of 2 */
#define MinVc (0)
#define MaxVc (1023)
#define MinCos (0)
#define MaxCos (2)
#define StandardCos (MinCos)
#define PremiumCos (MaxCos-1)
#define ControlCos (MaxCos)
typedef struct VcQueueStruct {
    VcQueueStruct  *prev;           /* used to put on attention */
    VcQueueStruct  *next;           /* ... fifo's */
    VcId           vc;              /* may not be needed ?? */
    Word           dppEnqueIndex;
    Word           dppDequeIndex;
    PktPtr         que [MaxVcQueLength];
} VcQueueType;
VcQueueType vcQue [MaxVc + 1][MaxCos+1];
volatile Word atmizerDequeIndex [MaxVc + 1][MaxCos+1];
                                /* upated by atmizer */
InitVcOueues {
/* needs to be invoked once at DPP startup */
for (vc = 0; vc <= MaxVc; vc++) {
    for (cos = MinCos; cos <= MaxCos; cos++) {
        quePtr = &vcQue [vc][cos];
        quePtr->prev = quePtr;
        quePtr->next = quePtr;
        quePtr->vc = vc;
        quePtr->dppEnqueIndex = 0;
        quePtr->dppDeQueIndex = 0;
        atmizerDeQueIndex [vc][cos]= 0;
    }
  }
}
Enqueue (VcQueueType *queuePtr, PktPtr pkt) {
/*  assumes caller has checked for room on the queue before calling */
    index = queuePtr->dppEnqueIndex;
    queuePtr->que [index] = pkt;
    queuePtr->dppEnqueIndex = (++index) & (MaxVcQueLength - 1);
}
Dequeue (VcQueueType *queuePtr) {
/*  assumes caller knows something is on the queue */
    index = queuePtr->dppDequeIndex;
    pkt = queuePtr->que [index];
    queuePtr->dppDequeIndex = (++index) & (MaxVcQueLength - 1);
    return pkt;
}
```

Once the packet forwarder has a packet that needs to be transmitted (i.e. all "duplication" for broadcast, fragmentation, and encapsulation has been done) it calls the output enqueuing routine to place the packet on the appropriate VC queue. Before the packet is placed on the queue, two checks are performed. The queue is checked to ensure there is room to accept the packet—if the queue is completely full, the packet is discarded. Secondly, if the global pool of buffers is getting low, the number of packets in the output queue is checked against a predefined "watermark", and if that level has already been exceeded, the packet is discarded.

In order to ensure fairness, packets for a [vc][cos] that have been forwarded to the atmizer, but not yet released by the atmizer, are included in the "total packets queued" calculation. The atmizer maintains it's own "dequeue" index for each [vc][cos], which it increments every time it has completed transmission, and returned the packet to the free pool. This index is used by the dpp in the queue size calculations when determining whether there is enough room on the vc-queue to accept another output packet.

The pseudocode that follows illustrates the per-vc queuing done by the dpp. (The attention fifo's, and work-to-do bitmasks referenced in the code are used by the output scheduler of the DPP.)

```
QueueIsEmpty (VcQueueType *queuePtr) {
    /*   returns TRUE if there are no packets in the queue waiting
         to be forwarded to the atmizer */
    return (queuePtr ->dppDequeIndex == queuePtr->dppEnqueIndex);
}
GetLocalQueueLength (VcQueueType *queuePtr) {
    /*   returns the number of packets in the queue that have not
         yet been forwarded to the atmizer */
    return ((MaxVcQueLength - queuePtr->dppDequeIndex +
             queuePtr->dppEnqueIndex) & (MaxVcQueLength - 1));
}
GetVirtualQueueLength (VcQueueType *queuePtr, vc, cos) {
    /* returns number of packets in queue, plus number forwarded to
    the atmizer that the atmizer has not transmitted yet */
    return ((MaxVcQueLength - atmizerDequeIndex[vc] [cos] +
             queuePtr ->dppEnqueIndex) & (MaxVcQueLength) - 1));
}
watermark[MaxCos+1] = {4,        /* standard & premium can queue */
                       4,        /* 4 pkts when buf pool is low */
                  MaxVcQueLength-1};  /* ct1 can fill entire que */
VcEnqueue (vc, cos, realmId, pkt) {
/* This routine should be called one or more times per iteration of
   the DPP main loop.
   It starts by checking the "most congested" tests, works towards
   "least congested", under the assumption that we want to minimize
   CPU usage when we are congested */
   queuePtr = &vcQue [vc] [cos ];
   itemsQueued = GetVirtualqueueLength (queuePtr, vc, cos);
   if ((itemsQueued > watermark [cos]) {
       /* we are experiencing some congestion, check if we are
          running low on global resources */
       if (BufsLeftInPool( ) < MinPoolSize)) {
           DiscardPkt (pkt);
           return;
       }
}
/* global resources are still okay, check if we have room on
   the queue for the vc - note that because of the wav we
   check for queue empty, we can't fill beyond MaxVcQueLength
   minus 1 */
if (itemQueued >= (MaxVcQueLength - 1)) {
    DiscardPkt (pkt);
    return;
}
/* there is room on the queue, and we have global resources, the
   final check is to ensure that vc is up */
connState = GetConnState (vc);
if (connState == VcDown) }
    DiscardPkt (pkt);
    return;
}
if (connState != VcCallProceeding) {
    /* if this is the first packet going onto the queue, tell the
       scheduler there is work to do for this queue */
    if (QueueIsEmpty (queuePtr)) {
        WriteAttentionFifo (realmId, cos, queuePtr);
    }
    /* tell the scheduler this realm needs attention */
    SetWorkToDoBit (realmId);
    pktsPending[realmId]++;
}
/* don't forget to put the packet on the queue :-) */
```

-continued

```
Enqueue (queuePtr, pkt);
}
```

The pseudocode presented above illustrates how packets are enqueued onto the per-vc queues, and how packets are discarded when resources are scarce. The dpp must dequeue the packets from those vc queues, and forward them to the atmizer, according to the following rules:

1. There must be fairness between realms
2. Within a realm, Control traffic is output using exhaustive round-robin.
3. Within a realm, High and Low priority traffic is allocated 80% and 20%, respectively, of the bandwidth leftover after control traffic is transmitted.
4. Low priority traffic can get 100% of the bandwidth if there is no High Priority or Control traffic queued.
5. The DPP does not have time to waste polling queues and realms that have nothing to transmit.

A few additional data structures are used to help keep track of which Realms, and which [vc][cos] queues require attention within each realm (the code implicitly takes advantage of the fact that a vc cannot be bound to more than one realm).

At the global level, a bitmask is maintained which identifies the realms that have packets queued for transmission. Any time that the VcEnqueue routine enqueues a packet on a vc queue, it sets the "work to do" bit for the realm, and increments a counter of the number of packets queued up on the realm (this can be seen in the pseudocode listed above). At the beginning of an iteration of the scheduler, a local copy of the realm "work to do" bitmask is taken, and all realms that have "work to do" get an opportunity to transmit one packet. Once all the realms have been serviced, a new snapshot of the "work to do" bitmask is obtained, and the process is repeated.

Note that the scheduler only services one realm each time it is called. Hence, it may take several iterations of the DPP main loop to complete one iteration of the scheduler. The "worst case" scenario occurs when the main loop calls the scheduler once per main loop iteration, and all 50 realms need attention—in this case, it takes iterations of the main loop to complete one iteration of the scheduler.

Once the scheduler identifies a realm to service, it must then decide which [vc] [cos] should be serviced (subject to the rules listed above). To assist the scheduler in this task, three "needs attention" FIFO's are implemented within each realm; one for each COS. When VcEnqueue places a packet on a VC queue for the first time, it places the queue descriptor on the "needs attention" FIFO for the [realm][cos] that the queue is associated with. The scheduler services the "needs attention" FIFOs according to the 100% control, 80% premium, and 20% standard ratios described above (although the ratios are currently allocated based on packet counts, NOT on bytes transmitted). Note that for a given realm only one packet is transmitted per iteration of the scheduler, thus ensuring that all realms get an equal chance at the backplane bandwidth.

The pseudocode that follows shows how the DPP scheduler services the VC queues.

```
#define MaxPremiumToSend (4)  /* number of premium packets that will
                                  be sent on a realm before 1 standard
                                  pkt will get sent */
ServiceOutputQueue ( ) {
/*  this only handles 32 realms, the actual implementation needs to
    handle 50. This routine should be called one or more times per
    iteration of the DPP main loop */
static LongWord localWorkMask = 0;
/*  if we can't push a packet down to the atmizer, return to the DPP
    main loop */
if  (AtmizerQueueIsFull ( )) {
        return;
}
/*  if we've serviced every realm who needed attention, get a new
    snapshot of the work to do bitmask to find out which
    realms need attention now */
if  (localWorkMask == 0) {
        localworkMask = realmWorkToDoMask;
}
/*  find the next realm that needs attention */
realmId = FindFirstBit (localWorkMask);
if  (realmId != NullRealmId) ;
    /*  if there is no more work for this realm, clear its bit in the
        global work-to-do-mask */
    if  ((pktsPending[realmId] == 0) {
        ClearBit (realmId, realmWorkToDoMask) ;
    }
}
}
ServiceRealm (realmId)
{
    /*  service control traffic for the realm */
    if  (!ServiceNextVC (realmId, ControlCos)) {
    /*  no control traffic */
    if  ((premiumSent[realm] >= MaxPremiumToSend)) {
        /*  We've sent our share of premium traffic for this vc, try and
            send a standard packet. If there are no standard packets to
            send, send a premium packet if we can. */
            premiumSent[realm] = 0;
        if  (!ServiceNextVC (realmId, StandardCos)) {
            if (ServiceNextVC (realmId, PremiumCos)) {
                premiumSent[realm]++;
            }
        }
    }
    else }
        /*  Try and send a premium packet. If there are no premium
            packets queued, try and send a standard packet */
        if  (!ServiceNextVC (realmId, PremiumCos)) {
            if (ServiceNextVC (realmID, StandardCos)) {
                premiumSent[realm] = 0;
            }
        }
    }
}
}
ServiceNextVC (realmId, cos)
/*  returns TRUE if it forwards a packet to the atmizer */
{
    queuePtr = ReadAttentionFifo (realmId, cos);
    if  (queuePtr == NULL)
        return FALSE;
    pkt = Dequeue (queuePtr);
    /*  tbd, if the vc id is in the pkt ptr, no need to keep it in the
        output queue structure (pointed to by queuePtr) */
    SendToAtmizer (pkt, queuePtr->vc, cos);
    pktsPending[realmId]--;
    /*  if there are more packets queued on this VC for this COS, put
        the VC back on the attention FIFO */
    if  (!QueueIsEmpty (queuePtr)) {
        WriteAttentionFifo (realmId, cos, queuePtr);
    }
    return TRUE;
}
```

The pseudocode that follows shows how the "needs attention" FIFOs are implemented. The "needs attention" FIFOs are doubly linked lists, where an empty list (or unattached list element) points back to itself. This allows for rapid insertion and removal from the lists, without having to deal with branches to accommodate "NULL pointer" conditions.

```
typedef stuct {
    VcQueueType *prev;
    VcQueueType *next;
} FifoType;
FifoType fifoHandle [MaxRealmId + 1] [MaxCos + 1 ; /* per-realm needs
                                                      attention Fifos */
InitAttentionFifos ( ) {
    /* this routine need to be invoked once at DPP init time */
    for (realmId = O; realmId <= MaxRealmId; realmId++) {
        for (cos = MinCos; cos <= MaxCos; cos++) {
            fifoPtr = &fifoHandle[realmId] [cos];
            fifoPtr->next = (VcQueueType *) fifoPtr;
            fifoPtr->prev = (VcQueueType *) fifoPtr;
        }
    }
}
WriteAttentionFifo (realmId, cos, vcQueuePtr) {
    fifoPtr = &fifoHandle [realmId] [cos];
    fifoPtr ->next->prev = vcQueuePtr;
    vcQueuePtr->prev = (VcQueueType *) fifoPtr;
    vcQueuePtr->next = fifoPtr->next;
    fifoPtr->next = vcQueuePtr;
}
ReadAttentionFifo (realmId, cos) {
    fifoPtr = &fifoHandle[realmId] [cos];
    vcQueuePtr = fifoPtr->prev;
    if (vcQueuePtr == (VcQueueType *) fifoPtr) {
        return NULL;
    }
    fifoPtr->prev = vcQueuePtr->prev;
    fifoPtr->prev->next = (VcQueueType *) fifoPtr;
    /* clean up the pointers in the dequeued item, or there will be
       problems if the item is subsequently "removed" from the
       attention queue */
    vcQueuePtr->next = vcQueuePtr;
    vcQueuePtr->prev = vcQueuePtr;
    return vcQueuePtr;
}
RemoveFromAttentionFifo (vcQueuePtr) {
        vcQueuePtr->next->prev = vcQueuePtr->prev;
        vcQueuePtr->prev->next = vcQueuePtr->next;
        vcQueuePtr->next = vcQueuePtr;
        vcQueuePtr->prev = vcQueuePtr;
}
```

When a vc goes down, the DPP must flush the output queues associated with the vc, and must remove the vc from the "needs attention" FIFOs.

When a vc goes up, if data has already been queued to the vc (during the "Call Proceeding" state), the vc must be placed on the appropriate "needs attention" FIFOs, and the "work to do" bit must be set for the realm the vc is associated with.

The pseudocode that follows illustrates how VC Down and VC Up is handled by the COS queuing subsystem.

```
FlushQueue (queuePtr) {
    index = queuePtr->dppDequeIndex;
    while (index != queuePtr->dppEnqueIndex) {
        DiscardPkt (queuePtr->que[index]);
        index = (++index) & (VcQueueSize - 1);
    }
}
/*  we have emptied the queue, set the enqueue pointer equal to the
    dequeue pointer (NOT the other way around, or we will end up being
    out-of-sync with the atmizerDequeIndex) */
queuePtr->dppEnqueIndex = queuePtr->dppDequeIndex;
RemoveFromAttentionFifo (queuePtr);
}
HandleVcDown (vc, realmId, oldVcState) {
```

```
/*  Transitioning from "upN or "proceeding" to "down" is ugly.
    Basically, anything already sent to the atmizer is allowed to be
    transmitted/dropped by the atmizer, as it sees fit.
```

```
/* The code below shows the DPP processing required on receiving a
   vc-down indication. */
pktsQueued = 0;
for (cos = MinCos; cos <= MaxCos; cos++) {
    queuePtr = &vcQue[vc] [cos];
    pktsQueued += GetLocalQueueLength (queuePtr);
    FlushQueue (queuePtr);
}
if  (oldVcState == VC_up) {
    pktsPending[realmId] -= pktsQueued;
    if ((pktsPending[realmId] == 0)
        ClearBit (realmId, realmWorkToDoMask);
    }
}
HandleVcUp (vc, realmId) {
/*  snippit of code to handle transition from Proceeding to Up This
    code should also be safe to use in the Down to Up transition,
    although it won't actually do anything in that case */
pktsQueued = 0;
    for  (cos = MinCos; cos <= MaxCos; cos++) {
        queuePtr = &vcQue[vc] [cos];
        pktCount = GetLocalQueueLength (queuePtr);
        pktQueued += pktCount;
        if (pktCount > 0)
            WriteAttentionFifo (realmId, cos, queuePtr);
    }
    if  (pktsQueued > 0) {
        SetWorkToDoBit (realmId);
        pktsPending[realmId]+= pktsQueued;
    }
}
```

Figure 8:
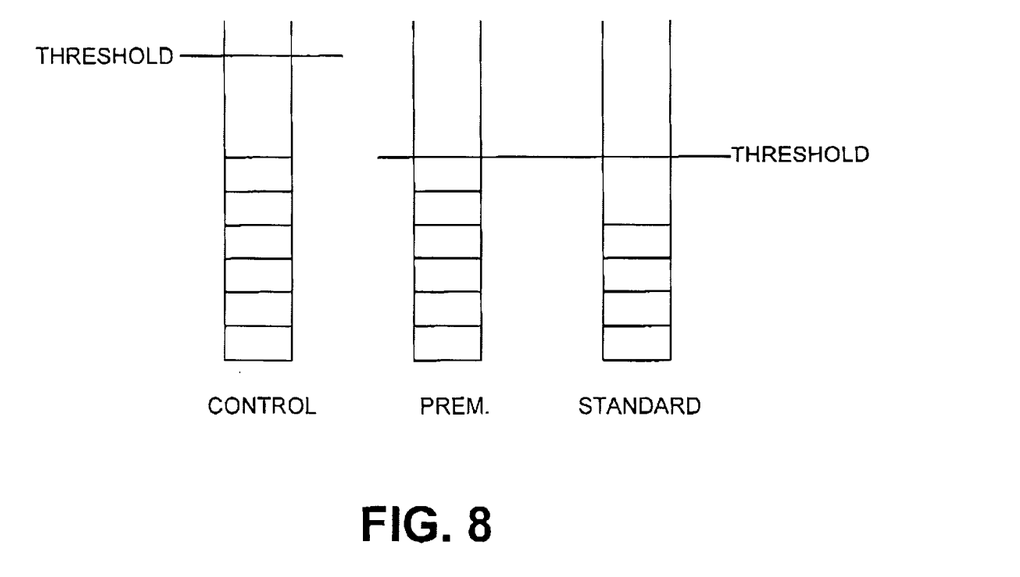
FIG. 8 illustrates a watermark threshold implementation in a queue control system according to the invention.

FIG. 8 shows a three queue VC arrangement wherein each queue holds items belonging to a different class of service. These include control data and standard and premium user data. It is within the scope of the present invention to apply a separate watermark threshold for each queue. The threshold applies to the capacity or length of the queue array. When the queue threshold is reached any new items destined for that queue are automatically discarded. As shown in FIG. 8 the threshold for control data can be at a higher level than for user data to ensure that control data is not discarded in favor of lower priority traffic.

Although specific embodiments of the invention have been described and illustrated it will be apparent to one skilled in the art that numerous variations and alternatives can be implemented without departing from the basic concept. It is to be understood, however, that such variations and alternatives will fall within the full scope of the invention as defined by the appended claims.

We claim:

1. A digtal system having a first processor for receiving a stream of packets and multiplexing said stream into queues in accordance with traffic parameters and a second processor for selectively receiving packets from said queues for subsequent processing a method of controlling queue size comprising; assigning a first indexing control variable to each of said packet queues said first indexing control variable designating a location in each of said queues for receiving a next packet; assigning a second indexing control variable to each of said queues, said second indexing control variable designating a location in each of said queues from which a next packet is to be serviced; and assigning a third indexing control variable to each of said queues, said third indexing control variable designating a last packet having been serviced but which has not yet been processed by said second processor; wherein said third indexing control variable is indexed after said last packet has been processed by said second processor.

2. A method as defined in claim 1 wherein each of said indexing control vaiables is an element of a queue length counter.

3. A method as defined in claim 1 wherein said first control variable and said third control variable respecting each queue are used to determine whether each of said queues can accept additional items.

4. A method as defined in claim 1 wherein said first indexing control variable is an enqueue pointer, said second indexing control variable is a dequeue pointer and said third indexing control variable is a virtual dequeue pointer.

5. A system for controlling queue size in a digital communications network, the network including first processing means for receiving data packets and placing said packets into queues in accordance with traffic parameter information included with said packet and second processing means for selectively receiving packets from said queues for subsequent processing, said system comprising: first indexing means to assign a first indexing control variable to each of said queues, sad first indexing control variable designating a next queue location for receiving a data item; second indexing means to assign a second indexing control variable to each of said queues, said second indexing control variable designating a next queue location for removal of a data item; and third indexing means to assign a third indexing control variable to each of said queues, said third indexing control variable designating a data item removed from said queue but not yet completely processed by said second processing means; wherein said third indexing control variable is indexed after said data idem has been processed by said second processing means.

6. A system as defined in claim 5 including a Carrier Scale Internetworking (CSI) architecture operating in an asynchronous transfer mode (ATM) network.

7. A system as defined in claim 6 wherein said CSI architecture includes an Internetworking Service Card (ISC) having said first and second processing means.

8. A system as defined in claim 7 wherein said CSI architecture divides said network into individual Realms, each Realm for providing Virtual Private Network services to one or more service subscribers.

9. A system as defined in claim 8 wherein each of said Realms includes a plurality of virtual circuits, each of said virtual circuits (VCs) being capable of providing differentiated classes of service.

10. A system as defined in claim 9 wherein said classes of service include control data and premium and standard classes of user data.

11. A system as defined in claim 10 wherein said first and second processing means share a global memory pool.

12. A system as defined in claim 11 wherein thresholds are assigned to said global buffer pool and to each of said queues.

13. A system as defined in claim 12 including means to check said queue thresholds before a new item is placed on said queue and if said queue has reached said threshold said new item is discarded.

14. A system as defined in claim 13 wherein if said queue threshold has not been reached said global pool threshold is checked before said new item is accepted.

15. A system as defined in claim 6 wherein said buffer is a first in first out (FIFO) buffer.

16. A system as defined in claim 9 including means to generate a work to do bitmask associated with said Realms in order to indicate that a Realm has packets to be processed.

17. A system as defined in claim 9 including a needs attention buffer to indicate that one of said VCs has packets to be processed.

* * * * *